United States Patent [19]
Lyons

[11] Patent Number: 6,085,909
[45] Date of Patent: *Jul. 11, 2000

[54] REUSABLE FLEXIBLE BAG FOR PACKAGING OBJECTS

[76] Inventor: Michael J. Lyons, 9013 Admont Ct., Louisville, Ky. 40220

[ * ] Notice: Under 35 U.S.C. 154(b), the term of this patent shall be extended for 638 days.

[21] Appl. No.: 08/786,665

[22] Filed: Jan. 21, 1997

Related U.S. Application Data

[63] Continuation of application No. 08/369,120, Jan. 5, 1995, abandoned.

[51] Int. Cl.$^7$ .................................................. B65D 81/02
[52] U.S. Cl. ..................... 206/584; 206/591; 206/524.8
[58] Field of Search ................................. 206/521, 522, 206/584, 591, 592, 593, 594, 524.8

[56] References Cited

U.S. PATENT DOCUMENTS

| | | |
|---|---|---|
| 3,066,382 | 12/1962 | Zweigle et al. . |
| 3,131,648 | 5/1964 | Seger . |
| 3,188,264 | 6/1965 | Holden . |
| 3,190,442 | 6/1965 | Gauss . |
| 3,222,843 | 12/1965 | Schneider . |
| 3,302,815 | 2/1967 | Morrison . |
| 3,304,219 | 2/1967 | Nickerson . |
| 3,412,521 | 11/1968 | Bauman . |
| 3,485,347 | 12/1969 | McGill et al. . |
| 3,515,267 | 6/1970 | LaRocca et al. . |
| 4,162,696 | 7/1979 | Sprung . |
| 5,149,065 | 9/1992 | Willden et al. . |
| 5,316,149 | 5/1994 | Tate . |
| 5,351,830 | 10/1994 | Bender et al. . |
| 5,515,975 | 5/1996 | Jarvis et al. . |

*Primary Examiner*—Jacob K. Ackun
*Attorney, Agent, or Firm*—Stites & Harbison; Vance A. Smith

[57] ABSTRACT

A packaging bag for the packaging of articles comprises an envelope made of flexible material containing light weight, energy absorbing, compressible particles in a closed pack relationship, the envelope being sealed into an air tight relationship about said particles and evacuated to an air pressure significantly less than atmospheric pressure such that the particles are maintained in a non-free flowing condition by exterior atmospheric pressure. The bag can then be molded around an article, placed within a container for shipment. Thereafter, the bag can be reused with other articles by restoring its original shape and then molded around the other articles, even if differently shaped, as before.

4 Claims, 2 Drawing Sheets

REUSABLE FLEXIBLE BAG FOR PACKAGING OBJECTS

This is a continuation of application Ser. No. 08/369,120 filed Jan. 5, 1995 and now abandoned.

BACKGROUND OF THE INVENTION

The present invention relates to materials for packaging articles and more particularly to a reusable enclosed bag containing small particles for packaging and cushioning articles in a container.

There are numerous techniques that have been employed to package articles of a fragile nature including today's preferred techniques of placing the article in a packaging container filled with resilient pieces of impact absorbing material such as foamed plastic or enclosing the article with layers of "bubble type" sheeting. All techniques have the objective of protecting the article against breakage primarily occurring during shipping and handling. Other conventional prior art techniques include those described, for example, in various patents such as in U.S. Pat. Nos. 3,222,843; 3,412,521; 3,515,267; 5,316,148; and 5,149,05.

U.S. Pat. No. 3,222,843 describes a technique of placing unfoamed material in a bag and placing the bag around an object positioned within a container and then introducing a foaming agent into the bag, causing the material to expand, engage and immobilize the article within the container.

U.S. Pat. No. 3,412,521 discloses a method of for packing articles enclosing an article with sealed bags containing foamed or expanded particles in a compressed stage and then puncturing the bags to allow the foam to expand and immobilize and cushion the article within the packaging container.

U.S. Pat. No. 3,515,267 details the use of a flexible bag that is filled with free flowing bodies such as foamed or expanded polystyrene beads having crush resistance properties and then sealed. The bags containing the beads are then stuffed between the article and container thereby providing an energy absorbing package in which the bags conform to the shape of the space between the article and container.

Similarly, U.S. Pat. No. 5,316,149 describes a porous envelope which is filled with expanded polymer beads and used as a stuffing in a container containing an object to be protected. The particles become compressed against each other when the envelope is stuffed into position but become free flowing again when the envelope is released.

An object of the present invention is to provide for an easily fabricated but light weight packaging bag which is reusable.

It is still another object of the present invention to provide for a light weight packaging bag that readily molds to the shape of the article to be packaged but can easily be returned to its original shape and reused.

It is a further object of the present invention to provide for a light weight packaging bag that is semirigid and is readily and conveniently stacked before use, can be molded into shape of the article to be packaged, will retain the shape of the article after the article has been removed, can be easily returned to its original shape and/or remolded to the shape of still other articles to be protected against impact.

It is yet another object of the present invention to provide for a method of making a light weight reusable packaging bag that retains its shape when being handled under normal conditions.

SUMMARY OF THE PRESENT INVENTION

In accordance with one embodiment of the present invention, a packaging bag for the packaging of articles comprises an envelope made of flexible material containing light weight, energy absorbing, compressible particles in a closed pack relationship, the envelope being sealed into an air tight relationship about said particles and evacuated to an air pressure significantly less than atmospheric pressure such that the particles are constrained from moving away from each other. The bag in its original and unused shape may be planar in shape, for example, and held by a corner without losing that shape because the particles within the envelope are maintained in a non-free flowing condition by exterior atmospheric pressure. Moreover, the user can easily carry the bag molded around an article and placed within a container for shipment. A decided advantage is that the bag can be reused with other articles by restoring its original planar shape and then being molded around the other articles, even if differently shaped, as before.

DETAILED DESCRIPTION OF THE PREFERRED EMBODIMENT

Figure 1:
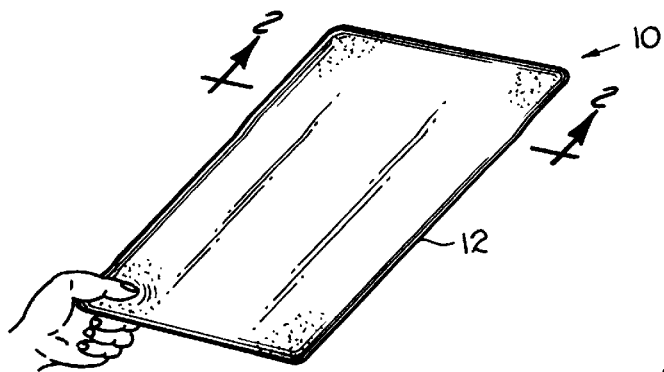
FIG. 1 is a schematic perspective of a packaging bag made in accordance with the present invention being held at one corner to illustrate the integrity of the bag under normal handling conditions.

In contrast to many prior art constructions of packaging bags, FIG. 1 is a demonstration of the "handling rigidity" of a package 10 constructed in accordance with the present invention. For the purposes of this description, "handling integrity" is defined as the ability of the envelope made in accordance with the present invention to maintain any given shape when it is handled. Having handling rigidity is an important attribute since such rigidity lends itself well to both storing the envelopes prior to use and in the procedure of packaging articles within a container. The initial planar configuration of bag 10 as shown in FIG. 1, provided during the manufacturing process, is extremely beneficial because it permits easy shipment in stacked form to users thereby minimizing space requirements and affords convenient stacking of the bags on use site location. Moreover, the user can easily carry the bag and subsequently mold the bag around the article to be protected in shipment. As FIG. 1 clearly indicates, the bag holds its shape even when supported or held by one edge thereof.

Figure 2:
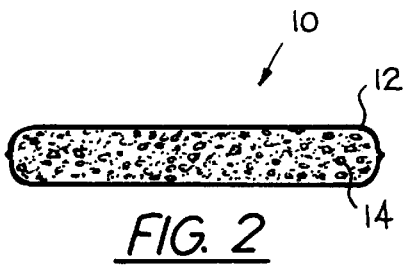
FIG. 2 is a sectional view of FIG. 1 taken along lines 2—2 of FIG. 1.

Simply the bag 10 is comprised of a sealed envelope 12 filled with small particles 14. The cross section of FIG. 2 illustrates that particles 14 within envelope 12 are closely packed and preferably have an irregular shape although, within the diameter ranges stated below, particles 14 may be provided with spherical or other uniform geometric shapes. It is desirable that the material have light weight, the ability to compress to some extent under pressure, and to assist in the maintenance of handling integrity. Preferably, particles 14 are made from a plastic foamed material such as foamed polystyrene or a foamed polyolefin.

The shape of the particles plays an important role in maintaining the integrity of the bag. The preferable irregular shapes provide an interlocking relationship among particles when placed under pressure and assist in the maintenance of the particles in a "non-free flowing condition" within the environment of the envelope. A non-free flowing condition, for purposes of this description, may be defined as a physical state of the particles within the envelope in which each particle is constrained from moving substantially from its position relative to neighboring particles. In other words, the particles cannot flow in the sense of loose particles within a container. The pressure imposed on the particles on the particles is due to air pressure differential. The air pressure within the envelope is lower than atmospheric pressure, causing the particles to be pressed together within the sealed envelope. This together with the interlocking relationship is sufficient to place the particles in a non-free flowing state.

Spherical particles or other uniform shapes particles may be used within the envelope if desired. However, it is important to ensure that the particles are slightly deformed at places of abutment to maintain the desired non-free flowing condition. This generally requires higher pressure differentials to maintain the desired non-free flowing state.

Envelope 12 can be fabricated from any material that can form an air tight envelope, sufficiently flexible enough to permit molding of bag 10 about articles, and sufficiently sturdy to resist bursting under ordinary article packaging situations. Preferably, envelope 12 is made of a plastic type material that has the above attributes but is suitable with a manufacturing process in which the envelope initially has an open end adapted to receive the particles but which can be heat sealed shut thereafter. A preferred material is polyethylene sheet material of about 1 to about 10 mils thick.

As stated above, an important feature of the present invention is the reduced air pressure within the interior of the bag. This is deemed necessary since it is essential that the particles within the bag remain substantially in position when the bag is flexed during use thereof in packaging. Shifting of the particles such that the particles move about the bag in a free flowing condition would result in the bag changing its shape when removed from about an article. Although the maximum permissible air pressure within the bag will vary depending upon the nature of the particles, it has been found that a internal bag air pressure of not more than about 5 PSI will be sufficient in most cases.

Additional it has been found that a bag having a width or thickness of about 1.3 to about 7.6 centimeters is acceptable in most packaging situations. A thickness of greater than about 15 centimeters vitiates the flexibility desired in packaging articles in most containers while a thickness of less than about 1.3 centimeters does not provide a sufficient absorption of forces exerted upon the packaging during shipping to prevent or minimize breakage.

Figure 7:
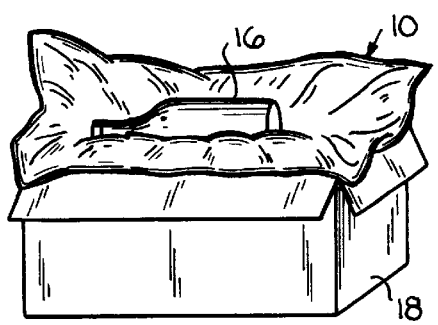
Figure 8:
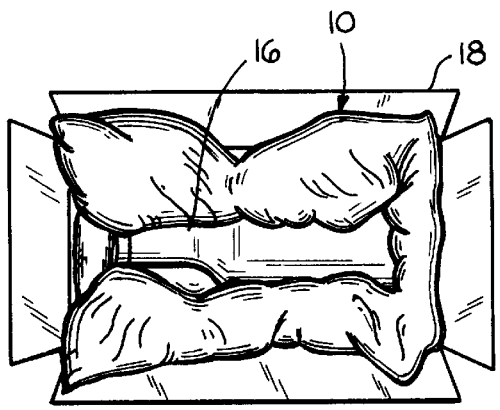
Figure 9:
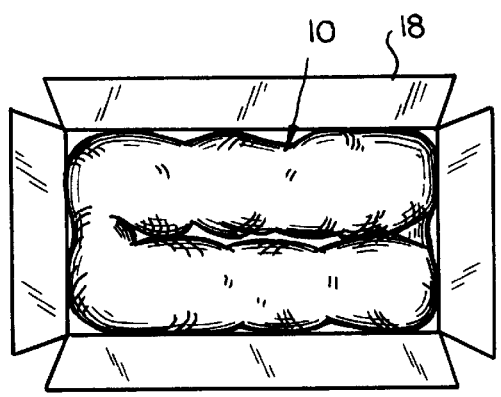
Figure 10:
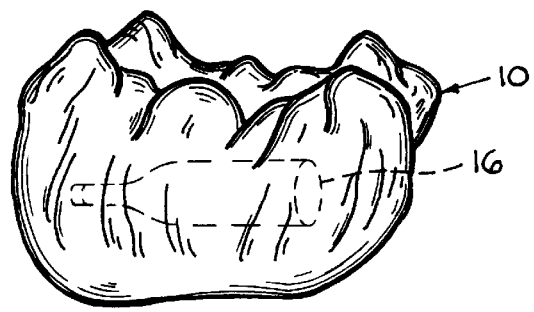
FIG. 10 illustrates in schematic form how packaging bag made in accordance with the present invention maintains its form once molded about an article.

Reference is made to FIGS. 6–10 to illustrate the versatility of a bag 10 in packing an article 16 within a container 18. Bag 10 of a shape preferably slightly larger than the opening into container 18 is placed over the opening and the article 16 is laid directly on bag 10. It should be noted that article 16 substantially retains its original planar shape even under the weight of article 16. As seen in FIGS. 7 and 8, article 16 is gently pushed into container 18 causing bag 10 to mold itself around article 16 and abut against the sides and eventually the bottom of container 18. Once bag 10 is pushed far enough into container 18 until bag 10 abuts the bottom of container 18, the edges of bag 10 can be folded around article 16 as shown in FIG. 9 and the container closed and sealed. FIG. 10 illustrates how bag 10 holds its shape taken on as described above when removed from container 18.

This feature permits the bag to be readily used by the typical consumer without any need of further change in the internal bag parameters.

Figure 3:
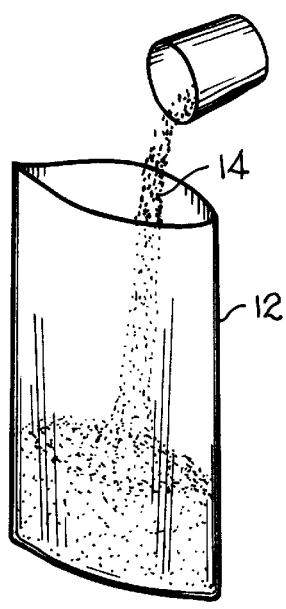
FIG. 3 is a schematic perspective of an envelope of a packaging bag having one unsealed end receiving particulate material.
Figure 4:
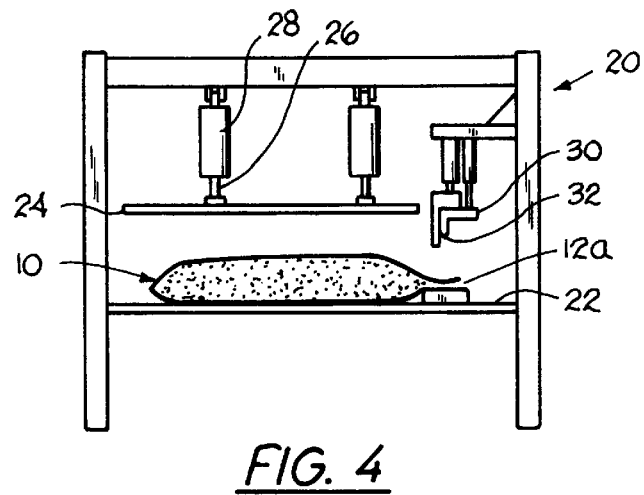
FIG. 4 is side elevation view of an apparatus for the compression and sealing of a bag shown in FIG. 3 prior to the application of the pressure and sealing thereof.
Figure 5:
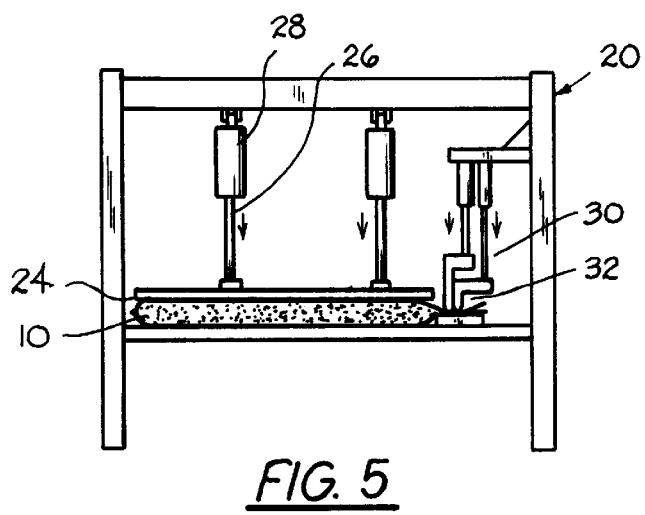
FIG. 5 is a view similar to FIG. 4 in which pressure and sealing are being applied to the bag of FIG. 3.
Figure 6:
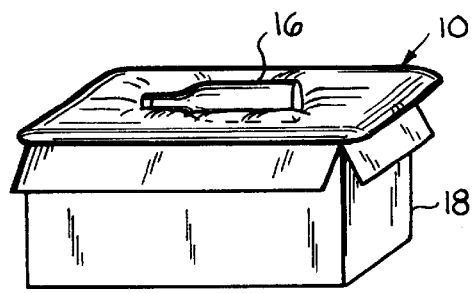
FIGS. 6–9 demonstrate in schematic form example steps of packaging an article using a packaging bag made in accordance with the present invention.

Reference is now made to FIGS. 3, 4, and 5 that depict a method and apparatus for the manufacture of bags in accordance with the present invention. In FIG. 3, a bag 10 comprising an envelope 12 of a material as stated above has an open end 12a. Bag 10 is shown being partially filled through open end 12a with plastic particulate 14 having irregular shapes and having an approximate width or diameter of between about 1.5 to 9.5 millimeters. Bag 10 is next placed in a manufacturing apparatus 20 horizontally on table 22 so that the open end 12a is beneath sealing mechanism 30. Apparatus 20 has a pressure plate 24 movable mounted on rods 26 extending from hydraulically operated cylinders 28. The hydraulic operation of such cylinders is well known to those with ordinary skill in the art and is not shown. When cylinders 26 are actuated, plate 24 is urged toward table 22 and compresses the material in bag 10 with a pressure exceeding several atmospheric pressures. Simultaneously, air with envelope 12 is forced out and mechanism 30 is actuated causing heat sealing gun 32 to engage the open end 12a and sealing envelope 12 shut to maintain the low atmospheric pressure within envelope 12 and the interlocking of the particles therein.

It should be noted that the bags made with the apparatus described above in accordance with the above technique can be held at one end and moved about and handled with ordinary care without detrimentally affecting the planar configuration. Moreover, once the bag is folded around an object, the bag will maintain that shape until molded into a new shape. The bag can also be returned to essentially its original shape by flattening the bag against any flat support surface by hand. The particles will not slide over one another and thus the width of the bag generally remains constant through out any molding operations performed on the bag.

In conclusion, the packaging bag made in accordance with the present invention meets the objectives as set forth above. The packaging bag maintains its original shape when being shipped to the user and in normal prepackaging handling, readily molds to the shape to the article being packaged thereby providing excellent impact resistance about the article, and finally can be reshaped and remolded for use with other and differently shaped articles. While the present invention has been described with the preferred embodiment as the focus, it should be understood that various changes and modifications can be made without departing from the intended scope and spirit of the claims.

I claim:

1. A reusable envelope for wrapping and packaging of a articles of various shapes comprising:

(a) a top surface having edges;

(b) a bottom surface having edges, said top and bottom surfaces being permanently sealed to define an exterior and an interior of said envelope;

(c) light weight and compressible particles in a closed-packed arrangement positioned within the interior of said envelope, said envelope and said particles collectively defining a planar shape having a thickness of up to about 15 centimeters, said interior of said envelope being at a lower air pressure than the atmospheric pressure on the exterior surface of said envelope so that there is a differential in air pressure between said interior and atmospheric pressure acting on said exterior, said differential air pressure and said thickness collectively maintaining said particles in said closed packed arrangement, providing sufficient rigidity to said envelope to maintain said envelope in said planar shape when being held at one end thereof, and providing sufficient flexibility to said envelope for it to be wrapped around and assume the shape of a first article without change in said differential air pressure, returned to said planar shape without change in said differential air pressure, and for it to be wrapped around and assume the shape of a second and differently shaped article without change in said differential air.

2. The envelope of claim 1 wherein said air pressure level is less than about 5 pounds per square inch and said particles comprise a material selected from the group consisting of expanded polystyrene and foamed polyolefin.

3. The envelope of claim 1 in which said particles are expanded polystyrene.

4. The envelope of claim 1 in which said particles have a diameter of about 1.5 to 9.5 millimeters.

\* \* \* \* \*